UNITED STATES PATENT OFFICE.

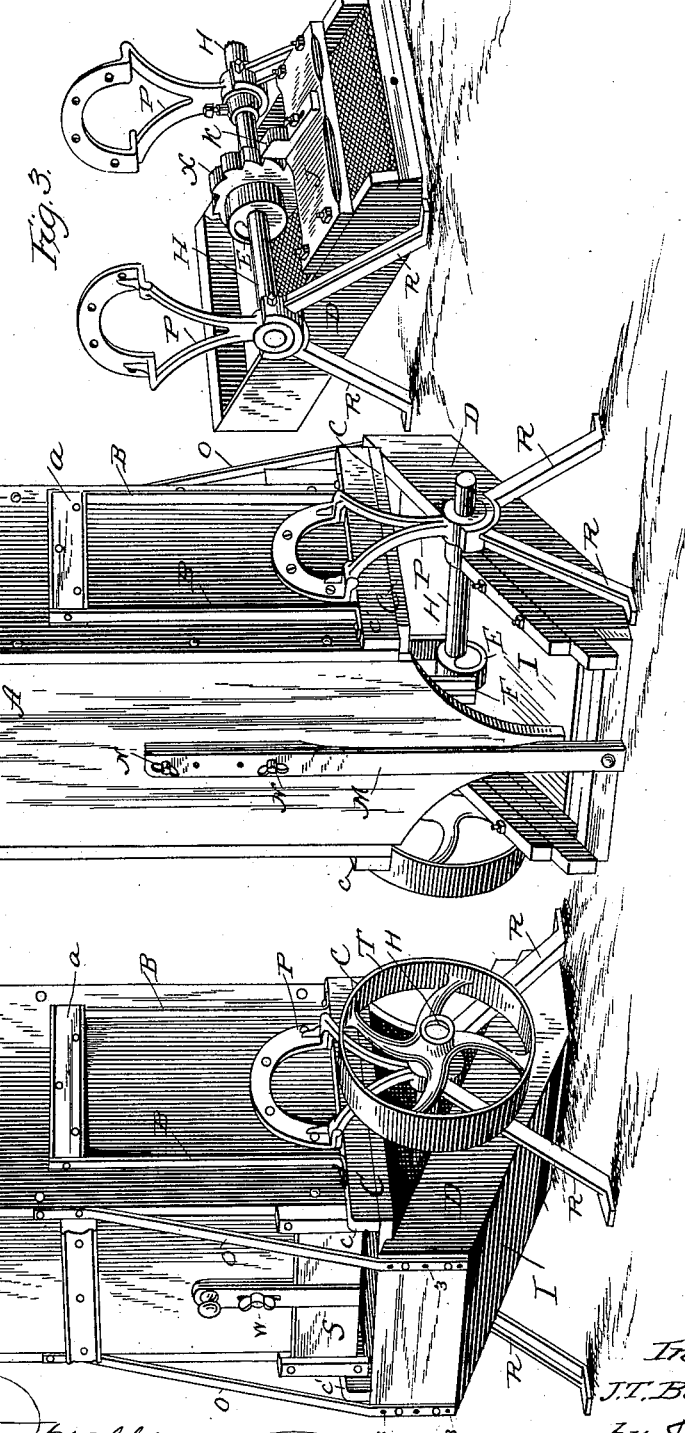

JOHN T. BURKETT, OF WATERLOO, IOWA.

COMBINED FEEDER AND SIFTER.

SPECIFICATION forming part of Letters Patent No. 359,496, dated March 15, 1887.

Application filed August 20, 1886. Serial No. 211,402. (No model.)

*To all whom it may concern:*

Be it known that I, JOHN T. BURKETT, of Waterloo, in the county of Black Hawk and State of Iowa, have invented a new and useful Improvement in a Combined Feeder and Sifter; and I do hereby declare that the following is a full, clear, and exact description of the same.

My invention is a combined feeding and sifting device, designed to be used in flouring, oatmeal, and other mills for the purpose of separating from the materials crushed or ground all foreign substances previous to feeding said crushed or ground materials to the reels or other machines about the mill.

My invention consists in the various details of construction and combination of the elements, all as hereinafter described, and particularly pointed out in the claims.

My invention is shown in the accompanying drawings, in which Figure 1 is a front perspective view of the complete apparatus. Fig. 2 is a rear perspective view of the complete apparatus. Fig. 3 is a perspective view of the sieve, the driving-shaft, and the devices carried thereon.

In the drawings, A is the receptacle or box for the material to be sifted, this box being of any suitable form and size. The receptacle is supported in a vertical position by suitable brackets, P P, the upper ends being screwed thereto above the bottom, the lower ends resting in sockets in the standards R R, forming the base of the device. Any other form of support or base may be substituted for the form shown. The receptacle is in the form of a deep box, with an open mouth and an oscillating bottom, C. This bottom is suspended from the body of the box by spring-hangers B B, situated on each side thereof and secured to the ends of projecting strips *a*, as shown. The lower ends of these hangers are attached to the bottom in a manner hereinafter referred to.

While I have shown the bottom suspended from the strips secured to the body of the box, it will be understood that other means—such as simple lugs—may be used instead. The bottom projects beyond the plane of the walls of the box at the sides, and strips *c c'* are secured to the upper surface of the bottom on these projecting sides and fit against the walls of the box on each side, and as the spring-hangers are secured to these strips, in the oscillation of the bottom they act as guides and prevent any displacement. A slide, S, is provided at one end of the box, and is adjustable vertically in ways, so as to allow any desired quantity of material to be fed therefrom. The slide is operated by a suitable handle connected to a vertical strip, which is slotted, as shown, to receive a thumb-screw, *w*, and the slide, after being set to allow any desired amount of material to feed out, may be held in such position by turning the thumb-screw. It will be understood, therefore, that as the bottom C is oscillated it projects the feed through the opening beneath the slide thus made by raising the said slide.

The machine thus far described may be used to great advantage in feeding to reels and other milling machinery material—such as sweepings, &c.—which is apt to choke up in the ordinary feed-chutes, for the reason that, as the bottom is continually oscillated by the machinery hereinafter described, the feed is positive, and no choking can be effected. I have also combined with this improved feeder a sieve for separating the foreign substances from the material before it is fed to the reel, and I shall now proceed to describe the same.

The sieve-frame (marked D) is supported from the front of the receptacle in an inclined position by spring-hangers O O, which aid in giving the return movement to the sieve-frame after it is oscillated by the positive means described hereinafter, these hangers O O being attached to the head of the frame and being adjustable thereupon by means of holes 3 in the lower ends of the hangers, by which adjustment the inclination of the sieve is varied at will, the head of the frame being always so placed in relation to the receptacle that the material coming out beneath the slide S will fall upon the sieve. Fastened to the rear of the receptacle at one end, and adjustable thereupon by means of thumb-screws N N, and at the other end secured to the foot of the sieve, is a wood spring, M, adapted to aid the hangers O O in returning the sieve to its original position after it has been moved therefrom. Beneath the sieve a gathering-bottom, I, is placed, and onto this the sifted material falls, being thus directed down the incline and through any suitable opening.

The main shaft H, from which both the receptacle and sieve are oscillated, is journaled in bearings in the standards R R, and carries a ratchet-wheel, X, the teeth of which are adapted to bear against a projection, K, fixed to a bar, J, extending across the top of the sieve-frame, as shown. This shaft H also carries an eccentric, E, working within a yoke, F, depending from the bottom of the receptacle, and by the movement of the said eccentric the bottom is oscillated. It will be understood, therefore, that the amount of oscillation may be increased or diminished simply by changing the form of the eccentric.

Power is applied to the shaft by means of a driving-pulley, T, from any suitable source.

In the operation of the device, should it be desired simply to feed the material to the reel or other milling device without sifting, the material is poured into the receptacle A. The slide S is set to any desired height, and in the revolution of the shaft H the eccentric E, working within the yoke F, oscillates the suspended bottom of the receptacle, which causes the material to feed positively through the opening beneath the slide upon the sieve D, or into any well-known form of conveying-chute. (Not shown.) If the sieve is used at the same time this oscillating movement of the bottom is taking place, the sieve is also oscillated to and fro. This is done by means of the ratchet-wheel X, the teeth of this wheel striking upon the piece K on the cross-bar J, and thus moving the sieve in a manner similar to the movement of the bottom. When the high part of the teeth of the ratchet has passed the piece K, the wood spring M, assisted by the hangers O O, returns the sieve to its normal position. Thus it will be seen that in the movement of the shaft the bottom of the receptacle is oscillated back and forth to shake the material onto the sieve, and at the same time the sieve is oscillated to sift the material thoroughly.

It will be understood that the sieve may have attached to it any suitable vessel or chute, (not shown,) to receive the sifted material and also the refuse.

It will be obvious that instead of the spring-hangers shown in the drawings any suitable spring-supporting devices may be used.

I do not wish to limit myself to the precise arrangement shown, as any slight addition thereto or variation therefrom would not depart from the spirit of my invention. Thus a slide similar to that shown may be employed at the opposite end of the receptacle, and by using an additional sieve or lengthening the one now shown the capacity of the machine would be increased. Further than this, I may utilize the spring action of the hangers B to move the bottom in one direction, the other movement being effected by the cam and any suitable projection.

I claim as my invention—

1. The combined feeder or sifter comprising suitable standards, R R, a shaft, brackets P P, the receptacle A, having the bottom provided with yoke F, the sieve-frame, and mechanism carried by said shaft for oscillating the said bottom and sieve-frame, substantially as described.

2. In combination with the feed-receptacle having an oscillating bottom, C, provided with the yoke F, the sieve-frame, the eccentric E, adapted in its rotation to force said bottom C out of its normal position, and a ratchet-wheel adapted to force the sieve-frame out of its normal position, and means for returning said sieve-frame to its original position, substantially as described.

3. In combination, a receptacle having a bottom provided with a yoke, the sieve-frame and main shaft, and the ratchet-wheel and eccentric upon said shaft for operating the bottom and sieve-frame, substantially as described.

4. In the described machine, and in combination, a main driving-shaft, H, a sieve adapted to oscillate, a ratchet-wheel, X, upon the shaft adapted to move the sieve in one direction, means for returning the same, a box or receptacle, A, having a suspended bottom and adjustable feed-opening, the eccentric carried on the main shaft, and a yoke upon the bottom of said receptacle, adapted to be acted upon by the said eccentric for oscillating it, all substantially as described, whereby in the action of the shaft the bottom and the sieve will each receive a vibratory movement for the purpose described.

In testimony whereof I have signed my name to this specification in the presence of two subscribing witnesses.

JOHN T. BURKETT.

Witnesses:
O. J. FULLERTON,
M. T. OWENS.